Aug. 18, 1931.   E. W. SULLIVAN   1,819,448
HOSE COUPLING
Filed Aug. 16, 1928   2 Sheets-Sheet 1
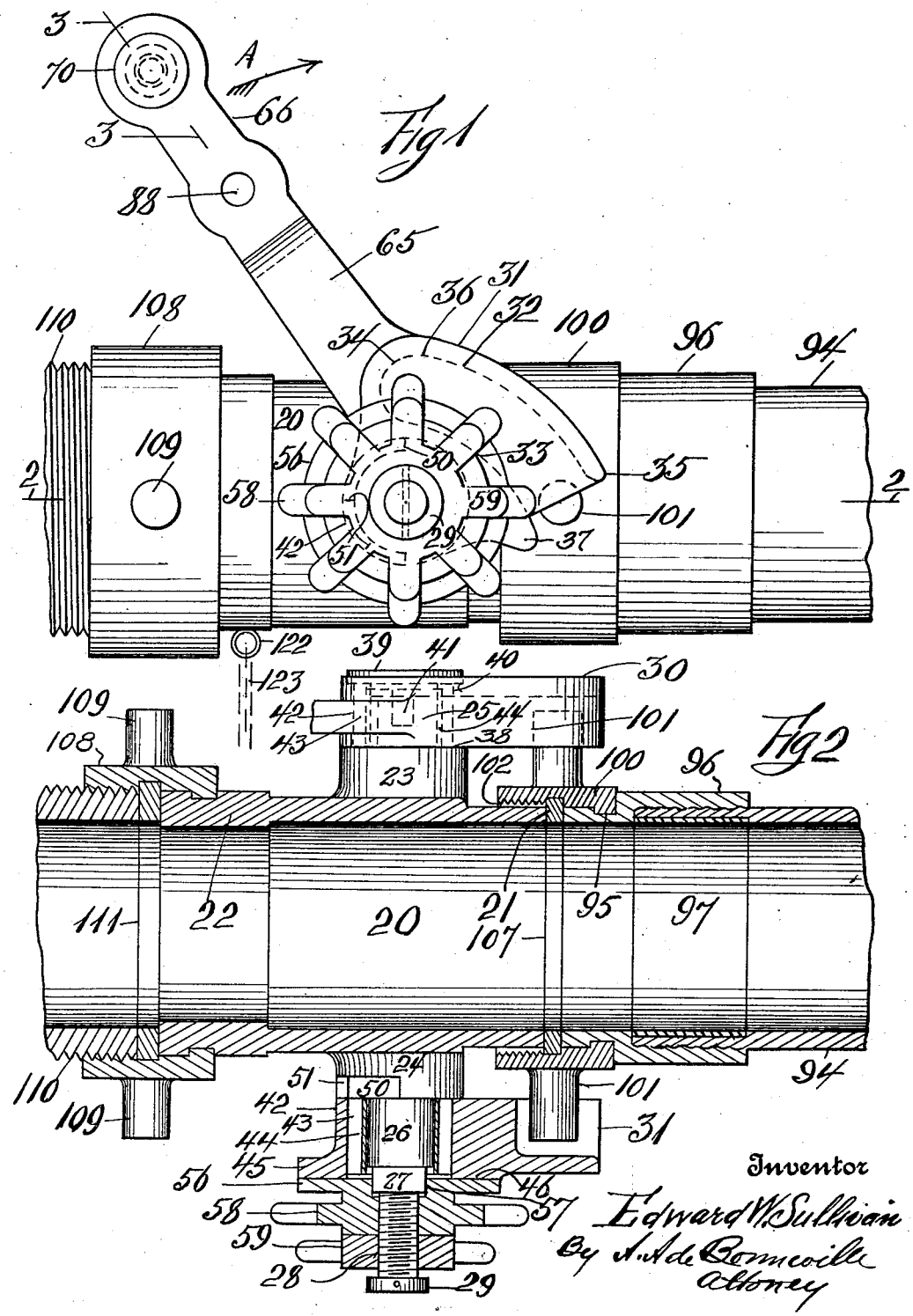

Aug. 18, 1931.  E. W. SULLIVAN  1,819,448
HOSE COUPLING
Filed Aug. 16, 1928  2 Sheets-Sheet 2
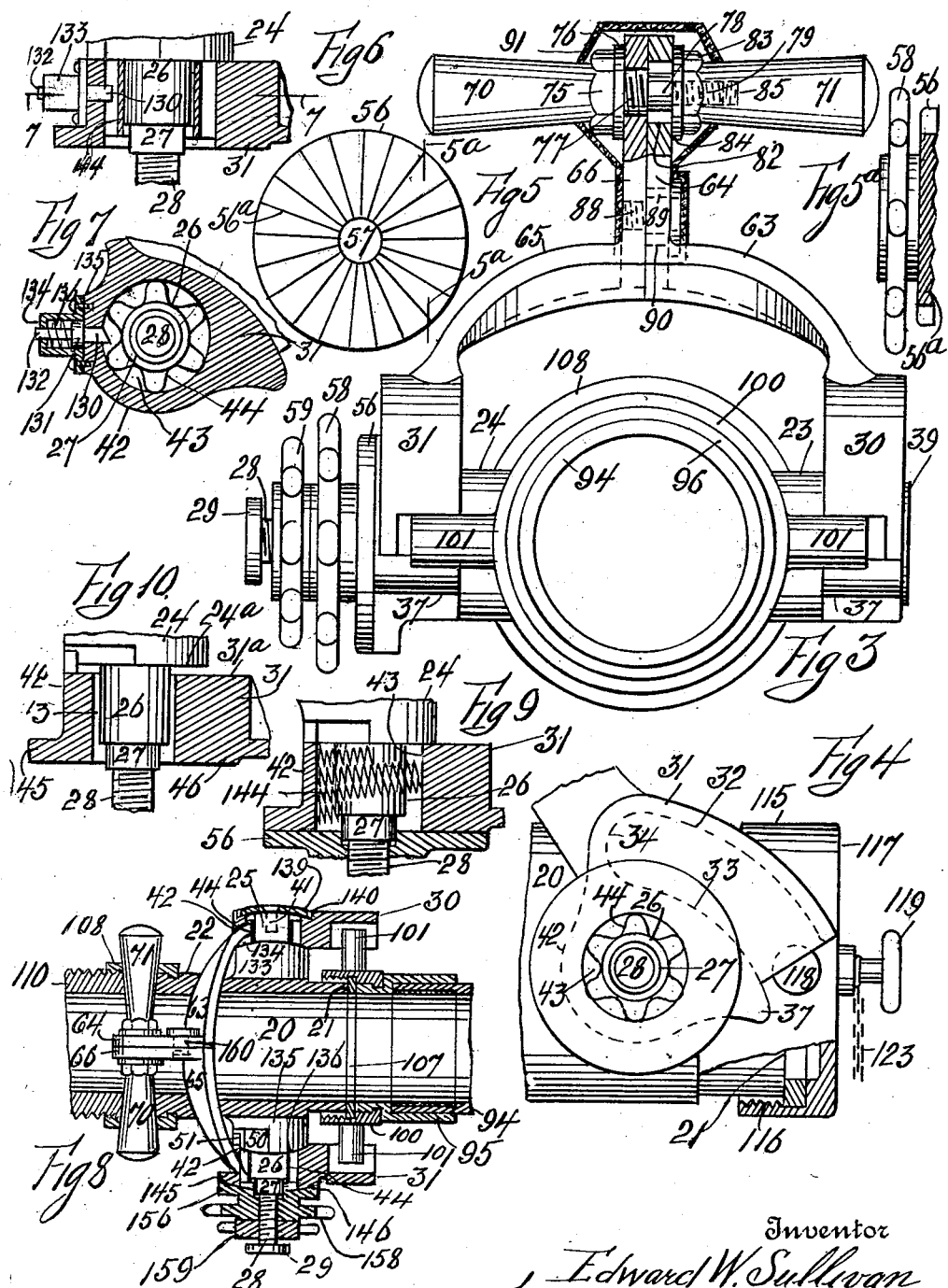
Inventor
Edward W. Sullivan
By his Attorney Patented Aug. 18, 1931

1,819,448

UNITED STATES PATENT OFFICE

EDWARD W. SULLIVAN, OF ROCKAWAY PARK, NEW YORK

HOSE COUPLING

Application filed August 16, 1928. Serial No. 300,073.

This invention relates to a hose coupling, and is an improvement of the hose coupling shown and described in my patent application filed February 13, 1928, Serial Number 253,998.

The object of the invention is the production of a hose coupling, that can be interposed between the outlet or inlet end of a pump and the female member of the coupling of a line of hose, irrespective of imperfections in the construction of the hose coupling or imperfections in the construction of the female member of the coupling of the line of hose. The female members of lines of hose are equipped with swivel nuts, having pins projecting from their outer circumferential surfaces, and these pins are often not diametrically opposite each other, and often not the same distance from the ends of their swivel nuts, and the present invention has for its primary object the engagement of its clamping appurtenances to the pins of the swivels of the female members of the couplings of lines of hose irrespective of said imperfections. The second object of the invention is the production of an improved hose coupling, adapted to be connected to the female member of the coupling of a line of hose without clearance or lost motion, to obtain a water tight joint between the improved hose coupling and the line of hose. The third object of the invention is the production of a hose coupling devoid of threaded ends. The fourth object of the invention is the production of a hose coupling which can be quickly and tightly connected to a line of hose and the like, by drawing the female member of the coupling of the latter, when swinging a member of the improved hose coupling, shown and described in this specification, and clamping said member in tight fication, and clamping said member in tight operative position. The fifth object of the invention is the production of an improved hose coupling with automatic adjusting elements to clamp it to a line of hose.

In the accompanying drawings Fig. 1 represents a side elevation of an exemplification of the improved hose coupling; Fig. 2 shows a partial top view and section of Fig. 1 on the line 2, 2; Fig. 3 is a right hand end view and section of Fig. 1 on the line 3, 3; Fig. 4 indicates a side view of a portion of the improved hose coupling with a cap clamped thereto; Fig. 5 is a rear view of a detail with a modification; Fig. 5a is a section of Fig. 5 on the line 5a, 5a; Fig. 6 shows a fragmentary portion of Fig. 2 with a modification; Fig. 7 shows a partial section of Fig. 6 on the line 7, 7; Fig. 8 represents a partial top view and axial longitudinal section of another form of the hose coupling; Fig. 9 shows a fragmentary horizontal longitudinal section of the coupling with another modification; and Fig. 10 indicates a section similar to Fig. 9 with a further modification.

Referring to Figs. 1 to 5, the improved hose coupling, in this instance, comprises the main cylindrical body portion 20, having the abutting end 21 and the swivel end 22. A pair of diametrically opposite bosses 23 and 24 extend from the body portion 20. A journal pin 25 extends from the boss 23, and a journal pin 26 extends from the boss 24. The pin 26 has extending therefrom the shank 27 having the threaded stem 28 with the detachable collar 29. A clamping head 30 is provided for the journal pin 25 and a clamping head 31 is provided for the journal pin 26. Each of the heads 30 and 31 has formed therein a U shaped cavity, having a top wall with the upper cam face 32 and the lower face 33 concentric therewith. The cam faces 32 and the faces 33 are eccentric to the axial center line of the pair of journal pins 25 and 26. Each cam face 32 is connected with one of the faces 33, by the curved end 34. Each cam face 32 is disposed so that its lower end 35 is more distant from the axial line of the pair of journal pins 25 and 26 than the portion 36 adjacent to the curved end 34. A disengaging lug 37 is formed with each of the heads 30 and 31.

The inner face 38 of the clamping head 30 bears against the boss 23. A washer 39 bears against the face of a recess 40 in the head 30 and against the outer face of the journal pin 25, and is held in place by a screw 41, which is in threaded engagement with an opening in the journal pin 25.

Each of the heads 30 and 31 has formed therewith a hub 42 which joins with the walls of the cavity having the cam face 32.

In each of the hubs 42 of the heads 30 and 31 is formed an opening 43, which is large enough to insert a spring 44 between its circumferential wall and the journal pins 25 and 26. A flange 45 extends from the hub 42 of the head 31, which joins with a projection 46 extending from the outer face of the head 31. The boss 24 has formed on its outer face the annular opening 50, and the hub 42 of the head 31 has formed therewith the projection 51, which latter can ride in said opening 50, to control the amount of the swing of the clamping head 31 and therewith the head 30.

A brake disc 56 has an opening 57 for the shank 27 and is adapted to bear on the projection 46 and the flange 45. A clamping nut 58 integral with the disc 56 is in threaded engagement with the threaded stem 28, and a jam nut 59 is also in threaded engagement with said stem 28. The face of the disc 56 may be corrugated as indicated at 56a.

A bowed member 63 having the handle 64, and the bowed member 65 having the handle 66, respectively extend from the heads 30 and 31. The adjoining faces of the members 63 and 65, and the handles 64 and 66 bear against each other and are in slidable contact with each other.

Handle bars are respectively indicated at 70 and 71. The handle bar 70 has formed therewith the six sided portion 75, and the flange 76. A threaded shank 77 extends from the flange 76, and a shank 78 with the second threaded shank 79 somewhat smaller in diameter than the shank 78 extends from the threaded shank 77. The threaded shank 77 is in threaded engagement with a threaded opening in the handle 66. The handle 64 has formed in its upper end the circular opening 82 larger in diameter than the shank 78 and through which the latter extends.

The handle bar 71 has formed therewith the six sided portion 83 and the flange 84. A threaded opening 85 in the handle bar 71 engages the threaded shank 79.

A screw 88 having the shank 89 is in threaded engagement with the handle 66 and extends through a circular opening 90 in the handle 64, larger in diameter than said shank 89. By virtue of the openings 82 and 90 and the shanks 78 and 89 being a trifle longer than the thickness of the handle 64, the said handles 64 and 66 can slide relatively to each other.

A covering 91 preferably of leather covers the handles 64 and 66 and a portion of the handle bars 70 and 71 to avoid any injury to the user of the coupling.

One end of a line of hose is shown at 94 with the female member 95 of its coupling having the enlarged portion 96. The hose 94 is clamped in place in the usual manner by means of the expansion ring 97. A swivel nut 100 having the pins 101 is rotatably secured to the female member 95.

The threads 102 of the swivel nut 100 clear the outer cylindrical surface of the abutting end 21 of the cylindrical body portion 20 of the improved hose coupling. The pins 101 are adapted to bear against the cam faces 32 of the heads 30 and 31. A gasket 107 of pliable material is located between the abutting end 21 and the adjacent edge of the female member 95.

The swivel end 22 of the body portion 20, has rotatively secured thereto the swivel nut 108, having the pins 109. The swivel nut 108 is adapted to engage in this instance, the threaded nipple 110 of the outlet of the pump of a fire engine. A gasket 111 is interposed between the end 22 of the improved coupling and the nipple 110.

Referring particularly to Fig. 4 the cylindrical body portion of the coupling is again indicated at 20 with its abutting end 21. The journal pin 26 is indicated with its shank 27 and the threaded stem 28. The clamping head 31 is indicated with its cam face 32, its lower face 33 and the curved end 34. The disengaging lug is again shown at 37. The hub of the head 31 is again indicated at 42 with its opening 43. The spring in the boss 42 is again shown at 44.

A cup shaped cap is indicated with the cylindrical portion 115 having the internal thread 116 and the head 117. Pins 118 extend from the cylindrical portion 115. A handle 119 extends from the head 117. The thread 116 is spaced from the outer face of the end 21 of the body portion 20 and performs no function therewith. The thread 116 is shown to indicate that an ordinary screw cap may be used for the abutting end 21 to close it.

An eyelet 122 see Fig. 1 extends from the body portion 20 and a chain 123 connects said eyelet and the handle 119.

Referring to Figs. 6 and 7, a fragmentary portion of the clamping head 31 is shown. The boss 24 is again indicated with the journal pin 26, the shank 27 and the threaded stem 28. The hub of the head 31 is again indicated at 42 with its opening 43. The spring in the said boss 42 is again shown at 44.

A latch 130 preferably rectangular in cross-section extends through the wall of the hub 42. A head 131 is formed with the latch 130 and a pin 132 extends from the head 131. A cap 133 having the head 134 is detachably fastened to the hub 42, which latter is slightly extended therefor as indicated at 135. The pin 132 is guided through an opening in the head 134. A spring 136 surrounds the pin 132 and extends between the head 131 and the inner face of the head 134.

By means of the latch 130 the spring 44 is turned around the journal pin 26, when the head 31 is swung in a direction opposite to the arrow A Fig. 1 so that said spring has its different portions in tension when the heads 30 and 31 are swung. It is to be understood that the latch 130 is applied to the hubs 42 of both clamping heads.

To use the improved hose coupling the swivel end 22 of the body portion 20 is connected to the nipple 110, by means of the swivel nut 108. The gasket 107 is located to bear between the female member 95 of the coupling of the lines of hose 94 and the abutting end 21 of the body portion 20 of the improved hose coupling. The handles 64 and 66 are located in the position best shown in Fig. 1, in which position the lower ends of the cavities of the clamping heads 30 and 31 are brought opposite the pins 101. The said handles are then swung in the direction of the arrow A, and the cam faces 32 engage one side of each of the pins 101, whereby the female member 95, of the line of hose and the abutting end 21 of the body portion of the coupling are drawn toward each other, and with the gasket 107 a tight joint is made between said body portion 20 of the improved coupling and the female member 95 of the coupling of the line of hose. At this time the clamping nut 58 is turned and the brake disc 56 is brought to bear against the flange 45 and the projection 46 of the clamping head 31. The operator next turns the jam nut 59 to force it against the clamping nut 58. By this means the clamping head 31 is securely locked in position. While the clamping heads 30 and 31 are forced to their clamping position, should the pins 101 not be located diametrically opposite each other or the same distance from the edges of the swivel nut, or should the cam faces 32 not be of exactly the same curvature or not be positioned exactly alike on opposite sides of the body portion 20 of the improved coupling, the flexibility of the springs 44 and the slidability of the handles 64 and 66 with respect to each other, permit the cam faces 32 to adjustably and automatically lock the pins 101 in proper operative position.

To disengage the female member 95 from the body portion 20, the handles 64 and 66 are swung back to the position best shown in Fig. 1, and if the said member 95 is not frozen to said body portion 20 it can be easily disengaged from the same. If frozen thereto the operator swings the said handles 64 and 66 a little further in a direction opposite to the arrow A, and the disengaging lugs 37 bear against the pins 101 on the sides opposite to the sides that were engaged by the cam faces 32, and the said female member 95 is disengaged from the body portion 20.

The cap having the head 117 is connected to the body portion 20, when the female member 95 is not connected thereto, and is clamped to said body portion 20 and disconnected therefrom as described for said female member 95 of the coupling of the line of hose 94.

Referring to Fig. 8, the main cylindrical portion of the improved hose coupling is again indicated at 20, having the abutting end 21 and the swivel end 22. A pair of diametrically opposite bosses, 133 having the spherical outer end 134, and 135 having the spherical outer end 136 extend from the body portion 20. The journal pin 25 extends from the boss 134 and the journal pin 26 extends from the boss 135. A washer 139 bears against the face of the recess 140 in the head 30 and against the outer face of the journal pin 25, and is held in place by the screw 41. The inner face of the washer 139 is preferably spherical and bears against a spherical seat of the recess 140. A clearance is provided between the circumferential edge of the washer 139 and the corresponding edge of the recess 140. The pin 26 has again extending therefrom the shank 27, having the threaded stem 28 with the detachable collar 29. The inner faces of the clamping heads 30 and 31 where they bear against the bosses 133 and 135 are made spherical. Each of the heads 30 and 31 has again formed therewith the hub 42. The springs 44 are again provided for the hub 42. The spherical flange 145 extends from the hub 42, which joins with a spherical projection 146 extending from the outer face of the head 31. The boss 135 has again formed on its outer face the annular opening 50 and one of the hubs 42 has again formed therewith the projection 51. A brake disc 156 having a spherical concaved inner face, and an opening to clear the shank 27 is adapted to bear on the projection 146 and the spherical flange 145. A clamping nut 158 integral with the disc 156 is in threaded engagement with the threaded stem 28, and a jam nut 159 is also in threaded engagement with said stem 28.

The bowed member 63 having the handle 64 and the bowed member 65 having the handle 66 again extend from the heads 30 and 31. The handle bars are again indicated at 70 and 71, and the handles 64 and 66 are tightly clamped together by means of the screw 160. One end of a line of hose is again shown at 94 with the female member of its coupling having the enlarged portion 95. The swivel nut is again shown at 100 having the pins 101.

The gasket 107 is again located between the abutting end 21 and the adjacent edge of the said female member. The swivel end 22 has again rotatively secured thereto the nut 108. The said swivel nut is adapted to engage the threaded nipple 110.

The operation of the coupling shown in Fig. 8 is similar to that already described and its particular advantages are the spherical connections between its bosses 133, 135 and the heads 30 and 31.

Referring to Fig. 9 one of the bosses for the body portion of the improved hose coupling is again shown at 24 with its journal pin 26, the shank 27 and the threaded stem 28. The brake disc is again indicated at 56. The head 31 is again indicated with its hub 42 having the opening or cavity 43. In place of the spring 44, a helical spring 144 encircles the pin 26.

Referring to Fig. 10 one of the bosses of the body portion of the coupling is indicated at 24 with its journal pin 26, the shank 27 and the threaded stem 28. The head is again shown at 31 with its hub 42, opening 43, flange 45 and projection 46. In this instance the face 24a of the hub 24, is normally spaced from the adjacent face 31a of the head 31 and a clearance space is left between the circumferential surface of the pin 26 and the wall of the opening 43, to allow the pin 26 to adjust itself in different positions in the opening 43.

Various modifications may be made in the invention and the present exemplification is to be taken as illustrative and not limitative thereof.

Having described my invention what I desire to secure by Letters Patent and claim is:

1. In a coupling the combination of a body portion having an abutting end, means to connect one end of the body portion to a conduit for a fluid, journal pins extending from the body portion, a flexible element supported on each of said journal pins, and a clamping head supported on each flexible element, said clamping heads adapted to draw the member of a coupling toward said body portion.

2. In a coupling the combination of a body portion having an abutting end, means to connect one end of the body portion to a nipple, a gasket bearing against the abutting end of said body portion, the female member of the coupling of a line of hose abutting against said gasket, a swivel nut rotatively supported on said female members, pins extending from the swivel nut, journal pins extending from said body portion, a clamping head coacting with each of said journal pins and a flexible element interposed between each journal pin and its clamping head, each of said clamping heads having a cam face disposed to engage the pins of said swivel nut.

3. In a coupling the combination of a body portion adapted to engage the female member of the coupling of a line of hose, a swivel nut rotatably supported on said female member, pins extending from the swivel nut, a pair of diametrically opposite journal pins extending from said body portion, a clamping head flexibly supported on each of said journal pins, each clamping head having a cam face eccentric to the axial line of the journal pins, said cam faces disposed to engage the pins of the swivel nut and means to swing the clamping heads to draw the female member of the line of hose to said body portion of the coupling.

4. In a coupling the combination of a body portion adapted to engage the female member of the coupling of a line of hose, a swivel nut rotatably supported on said female member, pins extending from the swivel nut, a pair of diametrically opposite journal pins extending from the said body portion, a spring supported on each journal pin, a clamping head supported on each of said springs, each clamping head having a cam face eccentric to the axial line of said journal pins, said cam faces disposed to engage the pins of the swivel nut, a bowed member extending from each clamping head and a handle extending from each bowed member, said handles slidably connected to each other.

5. In a coupling the combination of a body portion adapted to engage the end of a line of hose, a swivel nut rotatably supported on the end of the line of hose, pins extending from the swivel nut, a pair of diametrically opposite journal pins extending from said body portion, a spring supported on each journal pin, a clamping head supported on each of said springs, each clamping head having a cam face eccentric to the axial line of said pair of journal pins, said cam faces disposed to engage the pins of the swivel nut, a bowed member extending from each clamping head, a handle extending from each bowed member, said handles and the adjoining faces of the bowed members in slidable contact with each other, a handle bar having a threaded shank in threaded engagement with one of said handles, a shank devoid of threads extending from the threaded shank of the handle bar and extending through an enlarged opening of the other leg, a second threaded shank extending from said shank devoid of threads and a second handle bar in threaded engagement with said second shank.

6. In a coupling the combination of a body portion adapted to engage the female member of the coupling of a line of hose, a swivel nut rotatably supported on the female member of the line of hose, pins extending from the swivel nut, a pair of diametrically opposite journal pins extending from said body portion, a spring supported on each journal pin, a clamping head supported on each of said springs, each clamping head having a cam face disposed to engage the pins of the swivel nut, means to swing the clamping heads, means to clamp said heads to said body portion and means to revolve said springs.

7. In a coupling the combination of a body portion adapted to engage the female member of the coupling of a line of hose, a swivel nut rotatably supported on the said female member, pins extending from the swivel nut, a pair of diametrically opposite journal pins extending from said body portion, a shank extending from one of said journal pins, a threaded stem extending from said shank, a clamping head coacting with each journal pin, a brake disc supported on said shank disposed to bear against the outer face of its adjoining clamping head, a nut integral with said brake disc in threaded engagement with said stem to lock the brake disc against its head, each clamping head having a cam face adapted to engage the pins of the swivel nuts and means to swing said clamping heads.

8. In a coupling the combination of a body portion adapted to engage the female member of the coupling of a line of hose, a swivel nut rotatably supported on said female member, pins extending from the swivel nut, a pair of diametrically opposite journal pins extending from the body portion, a spring supported on each journal pin, a pair of clamping heads each having a hub with the latter supported on said springs, each clamping head having a cam face disposed to engage the pins of the swivel nut, means to swing the clamping head and a spring actuated latch slidably supported in each of said hubs to revolve said springs with the swinging in one direction of said clamping heads.

9. In a coupling the combination of a body portion adapted to engage the end of a line of hose, a swivel nut rotatably supported on the end of the line of hose, pins extending from the swivel nut, a pair of diametrically opposite bosses extending from said body portion, each of said bosses having a spherical outer end, a journal pin extending from each of said bosses, a clamping head for each of said journal pins coacting with the pins of the swivel nut, each clamping head having a spherical face to bear against the spherical ends of said bosses, one of said clamping heads having a spherical flange and a spherical projection integral therewith, a brake disc having a spherical concaved inner face and a nut integral therewith adapted to bear against said spherical flange and spherical projection, a threaded stem extending from one of said journal pins in threaded engagement with said nut, said other clamping head having a recess with a spherical seat formed therein and a washer having a spherical inner face secured to the second journal pin and bearing against the spherical seat of said recess.

10. In a coupling the combination of a body portion adapted to engage a coupling member of a line of hose, a swivel rotatably supported on said coupling member, pins extending from the swivel nut, a pair of diametrically opposite bosses extending from said body portion, each of said bosses having a spherical outer end, a journal pin extending from each of said bosses, a spring supported on each journal pin, a clamping head supported on each of said springs, each clamping head having a spherical face adapted to bear against the spherical ends of said bosses, one of said heads having a spherical flange integral therewith, a brake disc having a spherical concaved inner face and a nut integral therewith, adapted to bear against said spherical flange, a threaded stem extending from one of said journal pins in threaded engagement with said nut, said other clamping head having a recess with a spherical seat formed therein and a washer having a spherical inner face secured to the second journal pin and bearing against the spherical seat of said recess.

Signed at the borough of Manhattan, city of New York in the county of New York and State of New York this 29th day of May, A. D. 1928.

EDWARD W. SULLIVAN.